3,258,430
CATALYST REGENERATION COMPRISING A WASH AND TREATMENT OF WASH WITH ION EXCHANGE
Karsten Odland, La Grange, Ill., assignor to Nalco Chemical Company, Chicago, Ill., a corporation of Delaware
Filed Aug. 15, 1963, Ser. No. 302,334
4 Claims. (Cl. 252—420)

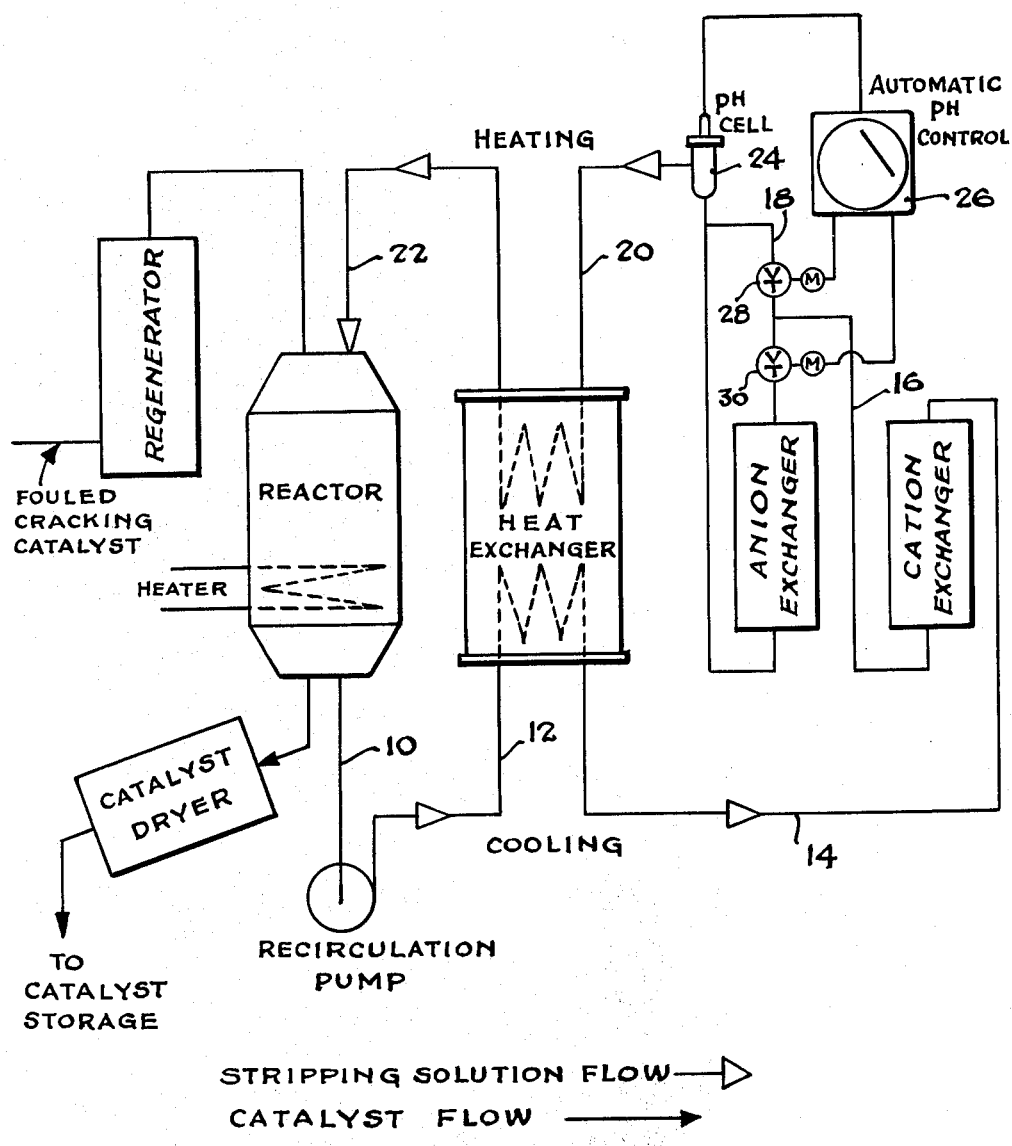

This invention relates to a method of treating used silica-alumina cracking catalysts to improve their operationl efficiency. The invention is particularly concerned with a method for removing metal contaminants from used silica-alumina cracking catalysts.

The conversion of petroleum hydrocarbons by means of silica-alumina catalysts is a well-known, long established process. A wide variety of silica-alumina type catalysts are available to petroleum refiners to enable them to convert the various petroleum fractions into a wide variety of useful products. The synthetic silica-alumina catalysts usually contain from 7 to 30% by weight of alumina. In some cases, it is possible to modify certain natural silica-alumina products, for example clays, whereby they are rendered catalytically active. One method of modification comprises incorporation with certain clays, additional quantities of synthetic alumina. Such catalysts oftentimes contain from between 30 and 35% by weight of alumina. In some instances, acid treated clays which contain from 15 to 50% by weight of alumina are used in the cracking of petroleum hydrocarbon products.

Regardless of the silica-alumina catalyst used in the cracking of hydrocarbons, it has been found that over an extended period of use, such catalysts frequently become fouled or contaminated with undesirable metallic constituents. Certain metal contaminants, particularly iron, nickel, and vanadium tend to reduce the efficiency of the catalyst, which is evidenced by excessive production of coke and hydrogen. To overcome the problem of metal contamination it is customary to add fresh makeup catalyst to catalytic cracking units, which not only reduces the quantity of metal fouled catalyst in the unit, but also allows the system to be maintained with a full charge of catalyst, since the operation tends to destroy the size of the catalyst, thereby producing fines.

It would be valuable if a process were available whereby metal contaminated catalysts could be simply treated to restore their operational efficiency. It would be of particular value if a simple process were available to treat metal contaminated silica-alumina catalysts for decrease in their coke and hydrogen forming tendencies. It therefore becomes an object of the invention to find an improved method for the treatment of metal contaminated silica-alumina cracking catalyst.

Another object of the invention is to provide a simple economic method for reducing the coke and hydrogen producing tendencies of metal contaminated silica-alumina cracking catalysts. Other objects will appear hereinafter.

In accordance with the invention, it has been found that it is possible to improve the operational efficiency of metal contaminated silica-alumina cracking catalysts by treating such catalyst with a metal ion-free water, which has a pH within the range of 2.5 to 5.5, for a period of time sufficient to remove at least a portion of the metal contaminants from the catalysts. After such treatment, the water is removed from the catalyst and the catalyst returned to the catalytic cracking unit from whence it was taken, or to other units, where it is ready for the further conversion of various types of petroleum hydrocarbons. In a preferred practice of the invention, the pH of the metal ion-free water is within the range of 3.4 to 4.0, and most preferably the pH is maintained within the range of 3.4 to 3.7.

The invention further contemplates a cyclic or batch process which continually utilizes and regenerates the water used to treat the catalyst, whereby there is continuously provided a metal ion-free water for the treatment of metal contaminated petroleum hydrocarbon cracking catalyst.

The customary practice of the invention is to either intermittently or continuously withdraw a portion of metal contaminated silica-alumina cracking catalyst from a cracking unit and place it into a suitable treating vessel. At this point, the catalyst is contacted with water which is free of metallic cations; the water is removed and the catalyst is then returned to the system for further utilization in the production of valuable hydrocarbon products. The contact time necessary to adequately remove metals from silica-alumina cracking catalyst with the metal ion-free water may be varied, with times ranging from as little as ½ to 3 hours being adequate in most cases. A shorter time may be utilized when elevated temperatures are employed. To keep the contact time reasonable, it is desirable that the metal ion-free water contact the catalyst at a temperature from at least 150° F. to at about the boiling point of such water.

The amount of water necessary to adequately contact the catalysts to insure complete removal of metal contaminants may be varied. Although it is desirable to use at least 1 volume of water per volume of catalyst, it sometimes is necessary to use as many as 4 volumes of water for good metal removal. It is readily obvious to those skilled in the art that the particular volume of water will, of course, be dependent upon the particular type of reactor used to contact the catalyst with the water.

In many instances, it is difficult to obtain a metal ion-free water which contains dissolved therein sufficient amount of acidic materials to produce a pH within the ranges specified above. It is, therefore, an important concept of the invention to provide a means for reutilizing the water used to treat the catalyst. In a typical large scale operation, it would be customary to initially treat the catalyst with deionized water, in the amounts and under the conditions specified above. It would not be necessary, initially, to adjust the pH of the water to within the range specified. As the water contacted the silica-alumina catalyst, a portion of the metal contaminants therein would be released in the form of metal salts. The water thus containing the metal salts would then be subjected to a hydrogen-form cation exchange resin treatment which would remove the metals and furnish a water which was metal ion free, and which, in many instances, would have a pH within the range specified. This water would then be further used to process more catalyst and could, or could not, be pH adjusted by the use of acidic materials. After continually recycling metal ion-free water having a pH within the ranges specified in contact with metal contaminated catalysts, experience shows that this water, after contact with the cation exchange resin, tends to show a progressive drop in pH. To maintain the pH's in the ranges prescribed, it is a further concept of the invention that at least a portion of the water be treated with an anion exchange resin in the free base form, whereby a portion of the acidity of the water is removed, thereby providing adequate pH control for purposes of treating metal contaminated silica-alumina cracking catalysts.

The use of the hydrogen form cation exchange resin in combination with anion exchange resin allows a particular batch of water to be used again and again for purposes of removing metal contaminants from silica-alumina catalysts. Suitable cation exchange resins are available commercially, with such products being described in Nachod et al., Ion Exchange Technology, Academic Press (1956). See also U.S. Patents 2,366,007, 2,591,574, 2,591,573, and 2,614,099. When the anion exchange resin is used as a pH controlling device, it is desirable that a weak base anion exchange resin be employed, due to its ability to readily remove acidity. Strong base anion exchange resins are also used.

To illustrate the efficacy of the invention for improving metal contaminated silica-alumina cracking catalysts, the following are presented by way of example.

EXAMPLE I 50 ml. of dry and burnt catalyst were added to a 1¼" I.D. x 6½" glass tube with a fritted glass, catalyst-retaining disc in the bottom. The catalyst was a metal contaminated, clay extended, silica-alumina cracking catalyst and corresponds to Example I of U.S. Patent 3,034,994. 10 ml. of sulfonated polystyrene divinylbenzene cation resin were added to a ⅜" I.D. x 10" glass tube with a fritted glass resin retaining disc in the bottom. The resin was of the type disclosed in U.S. Patent 2,366,007. The tubes containing the catalyst and the ion exchange resin were immersed in a constant temperature bath. 200 ml. of water were recirculated through the two tubes in series by means of a pump located outside the constant temperature bath. The recirculated water was demineralized prior to addition to the system without pH adjustment. The results of the tests are shown in Table I.

Table I

1. TYPE OF TREATMENT

| Catalyst Sample No. | Recirculation Time, Hours | Temp., Deg. F. | Recirculated Waters pH Values | | |
|---|---|---|---|---|---|
| | | | Initial | Final Catalyst Reactor Effl. | Final Cation Unit Effl. |
| 1a | None (Blank) | | | | |
| 2a | ½ | 180 | | 4.5 | |
| 3a | 1 | 165 | 4.5 | 3.95 | 3.65 |

2. PERCENT METALS REMAINING AFTER TREATMENT

| Catalyst Sample No. | Fe | Ni | V |
|---|---|---|---|
| 1a | .343 | .0236 | .196 |
| 2a | .350 | .0244 | .196 |
| 3a | .336 | .0126 | .101 |

EXAMPLE II

This experiment was conducted similarly to the experiment shown in Example I, except that the catalyst used was not burnt before the tests. Results of these tests are outlined in Table II.

Table II

1. TYPE OF TREATMENT

| Catalyst Sample No. | Recirculation Time, Hours | Temp., Deg. F. | Recirculated Waters pH Values | | |
|---|---|---|---|---|---|
| | | | Initial | Final Catalyst Reactor Effl. | Final Cation Unit Effl. |
| 1b | None (Blank) | | | | |
| 2b | ½ | 175 | 5.4 | 4.0 | 3.85 |
| 3b | 1.0 | 185 | 3.6 | 4.05 | 3.9 |

2. PERCENT METALS REMAINING AFTER TREATMENT

| Catalyst Sample No. | Fe | Ni | V |
|---|---|---|---|
| 1b | .364 | .0141 | .112 |
| 2b | .328 | .0150 | .1075 |
| 3b | .310 | .0134 | .0986 |

Maximum metal removal is noted with catalyst samples No. 3a and No. 3b, where the pH values were below 4.0 and where elevated temperatures were used.

From the above, it is evident that the invention allows the removal of metal impurities from contaminated cracking catalyst, and that this removal is sufficiently significant to materially improve the operational efficiency of the catalyst. The examples, particularly the data presented in Table II, show the effect of pH and elevated temperatures in relationship to contact time insofar as greater metal removal efficiency by the process of the invention is achieved. The catalyst No. 3b of Example II was subjected to conventional catalyst evaluations, particularly to determine amounts of coke and hydrogen produced. As a result of these tests it is evident, as can be seen from Table III presented below, that the invention greatly reduces both coke and hydrogen production.

Table III

UNTREATED CATALYST

| | Triplicate Runs | | |
|---|---|---|---|
| Wt. percent conversion | 58.2 | 48.5 | 44.1 |
| Hydrogen, Cubic Feet per barrel of crude | 321 | 234 | 194 |
| Coke, percent by wt | 7.24 | 4.40 | 3.00 |

PRETREATED CATALYST

| | Triplicate Runs | | |
|---|---|---|---|
| Wt. percent conversion | 68.7 | 61.0 | 52.3 |
| Hydrogen, cubic feet per barrel of crude | 142 | 116 | 89 |
| Coke, percent by wt | 9.14 | 5.0 | 3.92 |

The above shows the improved results obtained after the catalyst had been treated to remove the metals. The higher coke values for the treated catalyst, when compared with the blank, are quite favorable where consideration is given to the increased conversion levels at which the tests were run.

It will be obvious to those skilled in the art that several modifications of the invention may be made without departing from the scope thereof. For example, operational efficiency of the process may be improved by utilizing, before the cation and anion exchange resin treatment, a heat exchanger whereby the temperature of the spent water used to treat the catalyst is cooled to below 140° F., at which temperature it is more suitable for contact with the cation and anion exchange resins, due to the possibility of the high temperature water tending to reduce the capacity and degrade the resin. After the water leaves the cation exchange resin, or the anion exchange resin when pH adjustment is required, it is possible to use the spent heated water to reheat the anion exchange, or cation exchange, effluent water, or a blend, prior to its being used for treating more catalyst.

To illustrate the above preferred embodiment of the invention, reference may be had to the drawing which illustrates typical arrangements of processing equipment for treating silica-alumina cracking catalysts. After the catalyst has been treated by a conventional regenerator, it is then passed into a reactor where it is contacted by the metal ion-free water which has been heated to temperatures usually in excess of 150° F. After this washing treatment, the catalyst is dried and returned to the catalytic cracking unit for further treatment of petroleum hydrocarbons. The water flows from the reactor through drain line 10, and is pumped through line 12 into the heat exchanger where it is cooled to below about 140° F. After cooling, the water then flows through line 14 to the cation exchange resin where the metals are removed. After the cation exchange treatment, the water flows through lines 16, 18, and 20 to a hot leg of a heat exchanger where it is heated for reuse in the treating of additional metal-fouled catalyst. It enters the catalyst treating reactor through line 22.

When the water flows through line 18 after contact with the cation exchange resin, it contacts pH cell 24 connected to pH controls 26. When the pH recorder indicates excess acidity, the system shown in the drawing operates to bypass at least a portion of the cation exchange effluent to an anion exchange resin which is utilized as an acidity reducing unit. In operation the pH controller actuates pneumatically controlled motorized throttle valves 28 and 30; closing valve 28 while opening valve 30. Under these conditions, the cation exchange treated water passes to the anion exchange resin for a period of time sufficient to raise the pH to the desired level, at which point the pH controller closes valve 30 and opens valve 28.

It is contemplated that for minor pH control, valves 28 and 30 would always be partially open to allow a small portion of the water to contact the anion exchange resin.

From the above it may be gathered that several advantages are afforded by the practices of the invention. An important gain realized by the invention is that only metal contaminants are removed from silica-alumina catalyst. There is no loss of catalyst alumina. This may be attributed to the mild treating conditions set forth herein. Another advantage is that in the preferred practices of the invention, as illustrated by the drawing, there is little degradation of the ion exchange resins due to the temperature regulated water. A most important concept is the use of an anion exchange resin in conjunction with a cation exchange resin to maintain careful pH control of the water used to treat the catalyst.

It is within the practices of the invention that the cation metal free water may be used for one catalytic treatment and then discharged to suitable waste lines, or returned to other areas of petroleum refinery for purposes of utilization in the petroleum refining processes such as for example, in cooling various lines for purposes of heat exchange.

Having thus described my invention, it is claimed as follows:

1. A process for improving the operational efficiency of a metal contaminated silica-alumina cracking catalyst which comprises the steps of contacting said catalyst with a metal ion-free water which has a pH within the range of from 2.5 to 5.5 for a period of time sufficient to remove at least a portion of the metals from said catalyst, removing the water from said catalyst, and then contacting the removed water with a hydrogen form cation exchange resin to produce a metal ion-free water suitable for the treatment of additional metal-contaminated silicia-alumina cracking catalyst.

2. The process of claim 1 where the pH of the water initially treated by the hydrogen form cation exchange resin is adjusted between 2.5 and 5.5 by treating at least a portion of said water with a free base form anion exchange resin.

3. The process of claim 2 where the catalyst is contacted with the metal ion-free water for from ½ to 3 hours at a temperature of at least 150° F. to at about the boiling point of the metal ion-free water, with the volume of metal ion-free water to catalyst being at least 1:1.

4. A process for improving the operational efficiency of a metal contaminated silica-alumina cracking catalyst which comprises the steps of contacting said catalyst with a metal ion-free water, which has a pH within the range of from 2.5 to 5.5 and a temperature of at least 150° F., for a period of time sufficient to remove at least a portion of the metals from said catalyst, removing the water from the catalyst, cooling said water by heat exchange to below about 140° F., sequentially contacting said water with a hydrogen form cation exchange resin, and at least a portion of said water with an anion exchange resin, combining said resin treated waters to produce a finished water having a pH adjusted to about the pH of the starting water, heating said water by heat exchange to at least 150° F., and then reusing said water for the treatment of additional metal contaminated silica-alumina cracking catalyst.

References Cited by the Examiner

UNITED STATES PATENTS

| | | | |
|---|---|---|---|
| 1,199,032 | 9/1916 | Sulzberger | 252—413 |
| 2,380,731 | 7/1945 | Drake | 252—413 |
| 2,397,505 | 4/1946 | Richardson | 252—413 |
| 2,582,254 | 1/1952 | Hunter | 252—413 |
| 2,668,798 | 2/1954 | Plank | 252—413 |
| 2,681,305 | 6/1954 | Sweetser | 252—413 |
| 3,041,270 | 6/1962 | Leum et al. | 252—412 |
| 3,123,548 | 3/1964 | Connor et al. | 252—412 |
| 3,186,952 | 6/1965 | Brubaker et al. | 252—411 X |

OSCAR R. VERTIZ, *Primary Examiner.*

MAURICE A. BRINDISI, *Examiner.*

R. O. DEAN, H. S. MILLER, R. M. DAVIDSON,
*Assistant Examiners.*